United States Patent [19]

Kenner

[11] Patent Number: 5,437,061
[45] Date of Patent: Aug. 1, 1995

[54] PROTECTIVE GARMENT-TYPE COVER FOR USE WITH CHILD USERS AND CARRIAGES THEREFOR

[76] Inventor: Michael Kenner, 425 S. Catalina Ave. No. 6, Redondo Beach, Calif. 90277

[21] Appl. No.: 116,121

[22] Filed: Sep. 2, 1993

[51] Int. Cl.⁶ .................. A41D 3/08; A41D 11/00
[52] U.S. Cl. ........................... 2/69; 2/69.5; 2/75; 2/84; 2/88; 297/184.13
[58] Field of Search ............... 2/69, 69.5, 75, 80, 2/83, 84, 88, 89, 94, 243.1; 224/151 R, 158, 159, 32 R; 297/465, 485, 184.13

[56] References Cited

U.S. PATENT DOCUMENTS

| | | | |
|---|---|---|---|
| 2,156,504 | 5/1939 | Liss | 2/312 |
| 2,688,752 | 9/1954 | Sbarra et al. | 2/310 |
| 2,707,988 | 5/1955 | Shaub et al. | 2/69.5 |
| 4,241,458 | 12/1980 | Lesesne | 2/69.5 |
| 4,563,777 | 1/1986 | Park | 224/151 X R |
| 4,650,252 | 3/1987 | Kassai | 297/DIG. 4 |
| 4,759,082 | 7/1988 | Mulligan | 2/75 X R |
| 4,776,044 | 10/1988 | Makins | 2/209.13 |
| 4,858,248 | 8/1989 | Goldsmith et al. | 455/351 X R |
| 5,168,579 | 12/1992 | Marshall | 2/84 |
| 5,303,426 | 4/1994 | Jones | 2/209.13 |

Primary Examiner—Jeanette E. Chapman
Attorney, Agent, or Firm—Robert J. Schaap

[57] ABSTRACT

A protective garment-type cover for use by a child user, as well as for disposition over a carriage for the child user. The protective garment-type cover is constructed of a cloth-like material which is constructed in the form of a cloak or a poncho for wearing by a child user and which is also adapted and constructed so as to be disposed over a carriage used for transporting the child user. This carriage may be in the form of a stroller, a car seat, bicycle seat, or the like. The protective garment-type cover is also provided with a sound system for generating music or similar sounds for hearing by a child user when the protective garment-type cover is disposed on a child user. The protective cover can be folded into a small compact unit for a pouch integral with the cover for storage and transport 20 Claims, 3 Drawing Sheets

PROTECTIVE GARMENT-TYPE COVER FOR USE WITH CHILD USERS AND CARRIAGES THEREFOR

BACKGROUND OF THE INVENTION

1. Field of the Invention

This invention relates in general to certain new and useful improvements in a protective garment-type cover for use with child users, and particularly for use with child users and carriages for those child users where the protective garment-type cover may be both worn by the child and disposed over a portion of the carriage when the child is seated in the carriage and further to protective garment-type covers which include a unique sound system therefor.

2. Brief Description of the Prior Art

Raincoats and ponchos are well known and are frequently provided in sizes for use by children of all ages. These raincoats and ponchos, and similar garments, are often carried when there is an expectation of inclement weather. However, these garments are typically not designed for storage in small compact units which can be easily transported for the child.

Some carriages for children often contain umbrella-like structures which are hingedly mounted on the carriage and capable of extending over the head of the child user. While this type of cover does provide some protection from rain and other inclement weather, it is limiting in that the sides are open and there is nothing which envelopes the child user to protect the child user from the inclement weather.

For many years, there have been devices directed to personal sound systems. The most common of these sound systems rely upon a headphone arrangement where the speakers are held to the ears of the user by the user's hands. Other variations provide for attachment of speakers to a combination suspender/belt harness which attaches to the body of the user.

While stereo earphones are satisfactory for the reproduction of stereo sounds from cassette tapes and like media, it is desirable to have the ears free of such ear phones in order to hear ambient noise, and other sounds such as instructions and also to enable hearing of the stereo sounds as, for example, by an infant or a toddler.

There has also been a relatively recent introduction of a cassette-type playing arrangement typically referred to as a "Walkman"-type radio. This type of device is portable in nature, battery powered and capable of being carried by a user for listening to tape sounds, radio transmissions or the like. The problem with this "Walkman"-type radio system is that it is bulky, somewhat heavy and would present some difficulty in operation to a child user.

OBJECTS OF THE INVENTION

It is, therefore, one of the primary objects of the present invention to provide a portable garment-type protective cover which can be adapted for disposition over a child user and which can also be adapted for disposition over a carriage for use with that child user.

It is another object of the present invention to provide a protective garment-type cover of the type stated which almost fully envelopes and encloses a child user in a carriage for protection against inclement weather conditions.

It is a further object of the present invention to provide a protective garment-type cover of the type stated which includes a unique sound system for enabling the child user to hear sounds when the protective cover is worn by the child user.

It is an additional object of the present invention to provide a protective garment-type cover which can be folded in a small compact unit for storage and transport.

It is still another salient object of the present invention to provide a protective garment-type cover of the type stated which can be manufactured at a relatively low cost and which is highly effective in operation.

With the above and other objects in view, my invention resides in the novel features of form, construction, arrangement and combination of parts presently described and pointed out in the claims.

BRIEF SUMMARY OF THE DISCLOSURE

A protective garment-type cover for wearing by a child user and for potential disposition over a carriage for such child user. In this case, the carriage for the child user may adopt a variety of forms and is not limited to a four-wheeled carriage, but may be used with strollers, car seat carriers, bicycle carriers and the like.

The protective garment-type cover comprises a flexible and foldable cloth-like material sheet having a partially enclosing a continuous wall. The sheet is provided with an enlarged open lower end for disposition over a child user and/or disposition over a portion of a carriage for that child user.

The cloth-like material sheet is provided with an open neck region on the continuous side wall to allow the head of a child user to project outwardly of this continuous wall when worn about the child user. Furthermore, the cover envelops the remaining body portions of the child user which are then fully enclosed and enveloped within the protective garment-type cover.

Be flexible and foldable cloth-like material sheet is light in weight and capable of being folded into a small compact unit for both storage and transport. It is also easily and rapidly opened for disposition over a child user and a carriage for that child user.

A pouch may be integral with the protective garment-type cover so that the remaining portions of the cloth material can be easily folded and stored directly into that pouch for retaining the same in a small compact condition.

The enclosing continuous side wall is provided with arm openings which allow the arms of the child user to project through these openings. The partially enclosing continuous side wall may also be provided with an additional opening to receiving handle portions of the carriage. Further, there may be provided an openable front portion in communication with the neck region. This allows insertion over the child user's head and torso and easy access to the child user, as may be required.

Portions of the garment-type protective cover have elastic bands around the openings, such as the lower end thereof, in order to tighten the sheet material either against either the carriage or the child user. The same holds true of the opening which receives a portion of the handle of the carriage.

In one of the preferred embodiments of the present invention, the protective garment-type cover includes a sound system for use with the protective garment-type cover. In this case, the sound system may rely upon a portable cassette-type player located either in the pouch or separate compartment designed for holding the cassette-type player. Speakers are provided in a head portion of the garment-type cover and located in the region of the ears of the child user. The cassette player would then be suitably electrically connected to the speakers for providing sounds, such as musical sounds to the child user.

This invention has may other purposes and has other advantages which will be made more fully apparent from a consideration of the forms in which it may be embodied. One of these forms of the unique and novel protective garment-type cover is disclosed in the following detailed description of the invention and is more fully illustrated in the accompanying drawings. However, it should be understood that this detailed description and the accompanying drawings are set forth only for purposes of illustrating the principles of the invention, but are not to be taken in a limiting sense.

BRIEF DESCRIPTION OF THE DRAWINGS

Figure 1:
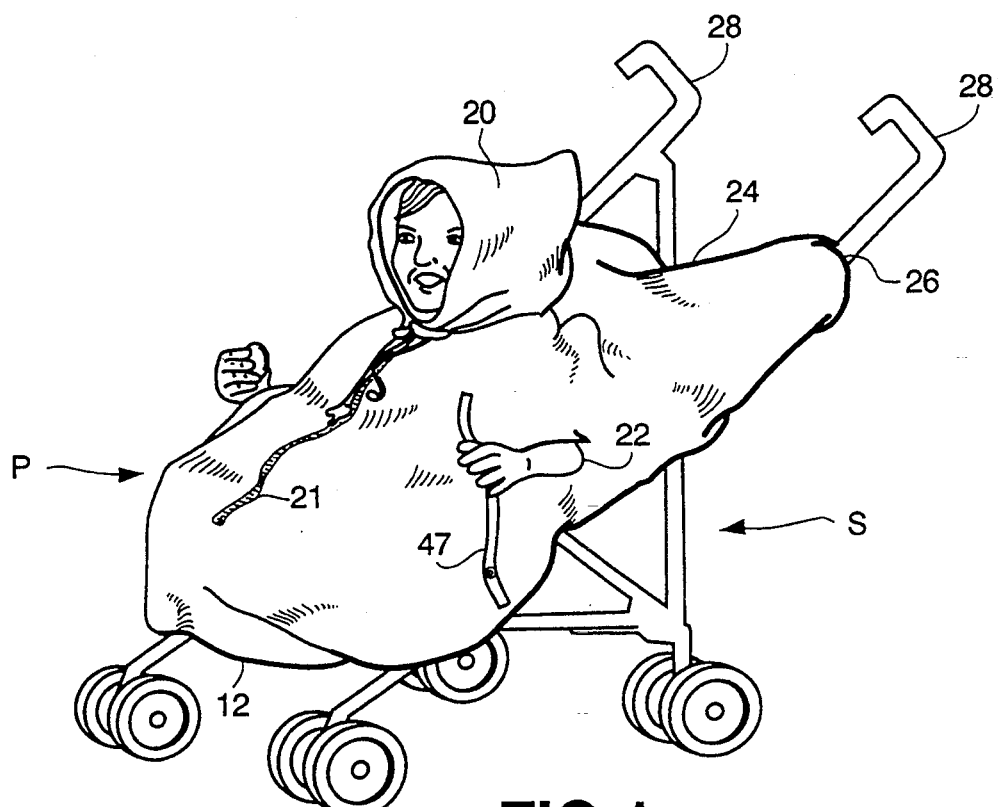
Figure 2:
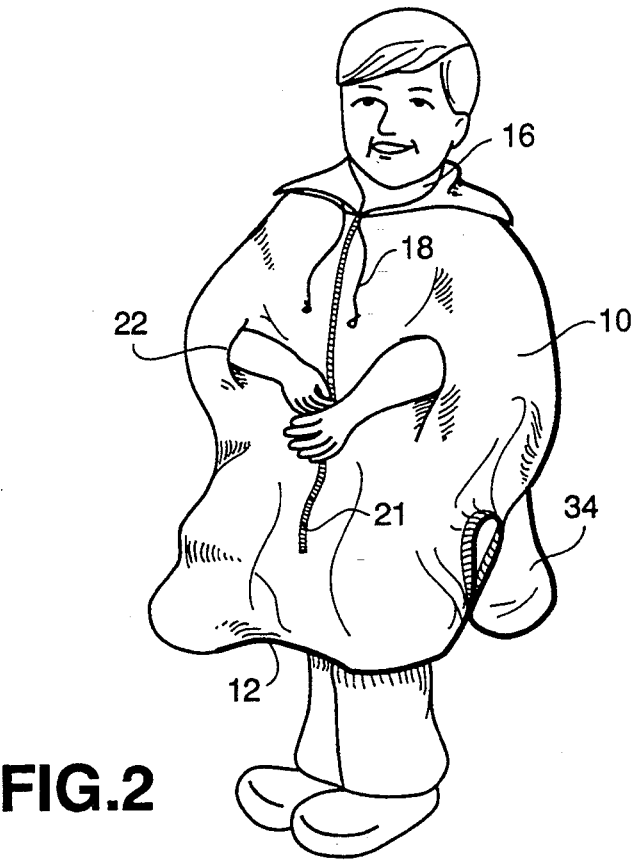
Figure 3:
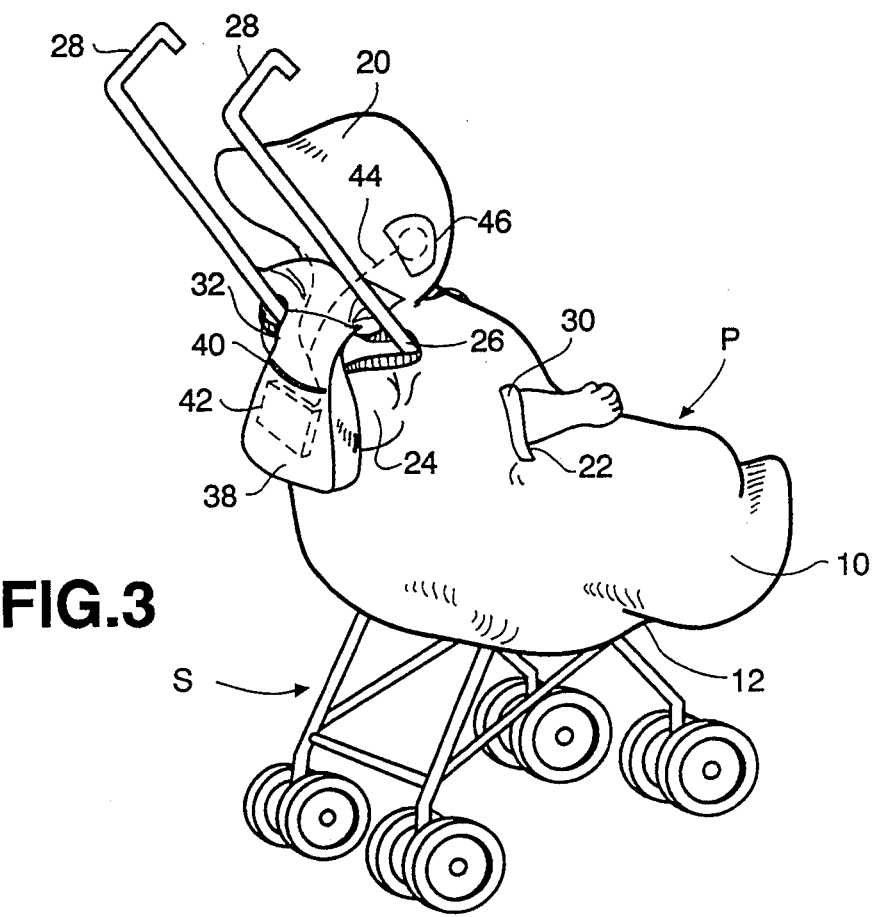
Figure 4:
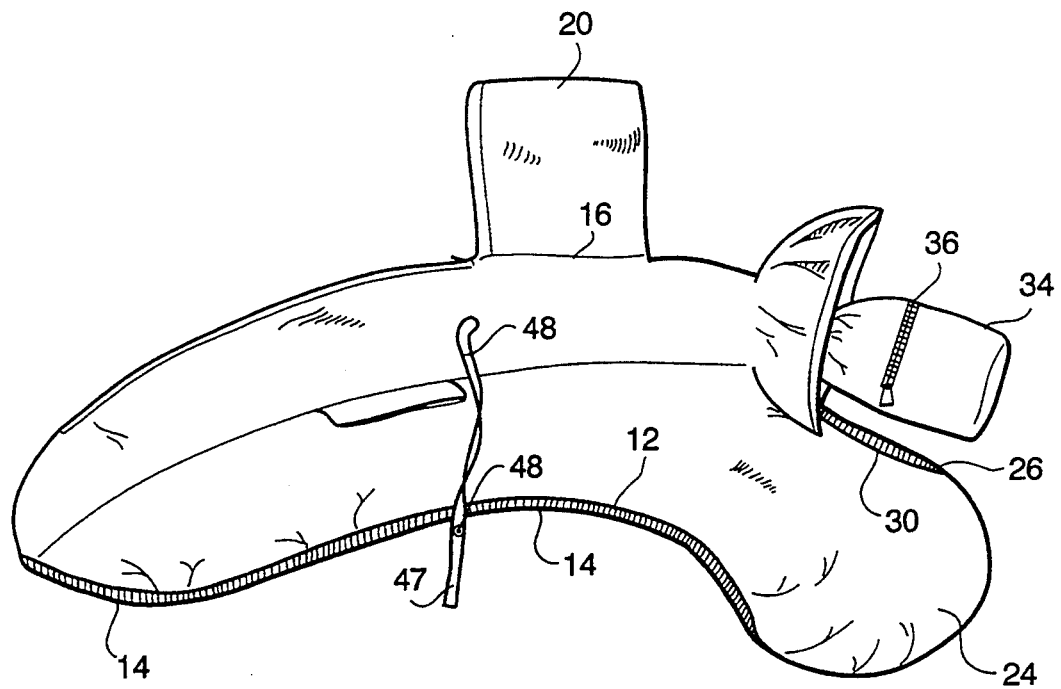
Figure 5:
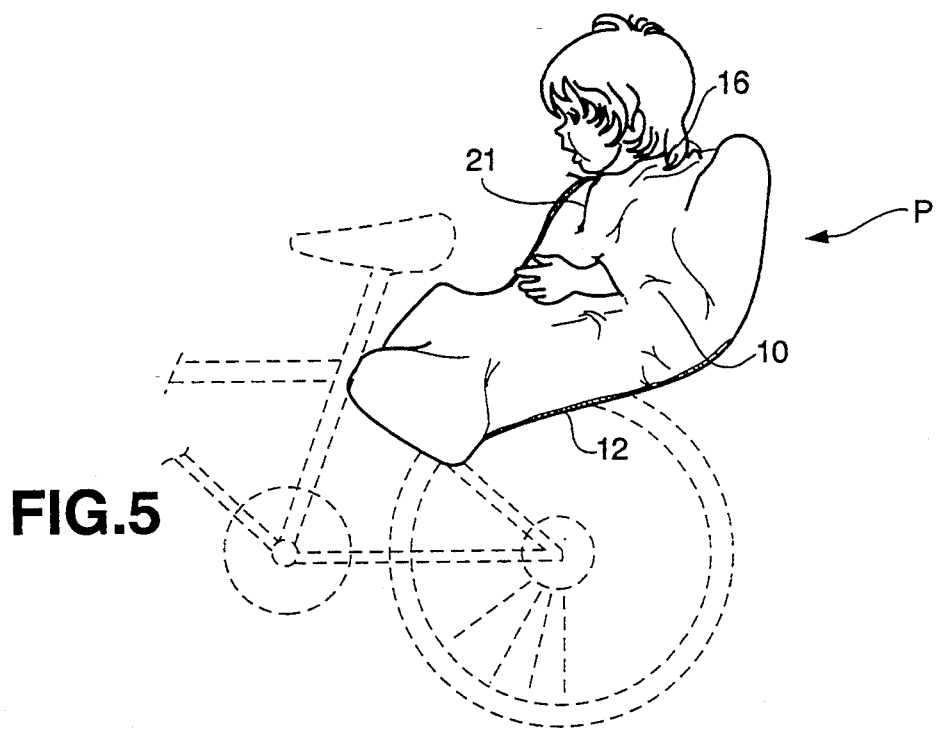
Figure 6:
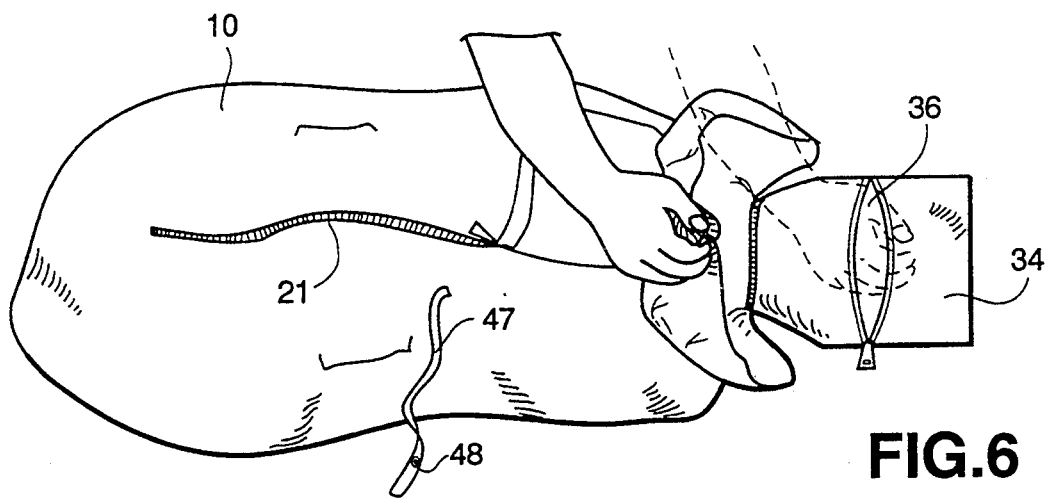
Figure 7:
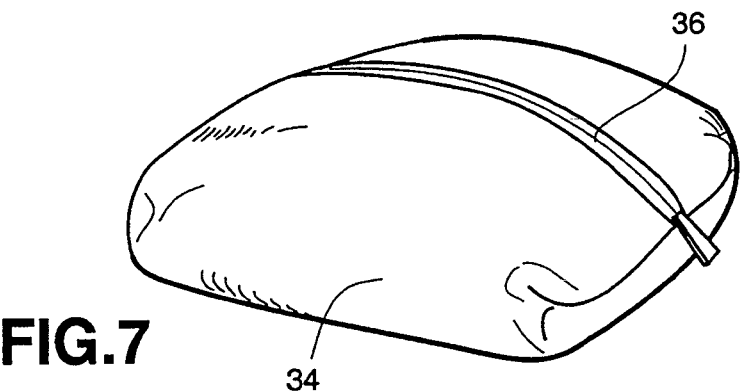

Having thus described the invention in general terms, reference will now be made to the accompanying drawings in which:

FIG. 1 is a perspective view showing the use of the protective garment-type cover disposed over a stroller with a child user therein;

FIG. 2 is a perspective view showing the protective garment-type cover disposed only over a child user;

FIG. 3 is a perspective view, taken essentially from the rear side, and showing a portion of the protective garment-type cover over a stroller;

FIG. 4 is a side elevational view of the protective garment-type cover in a flat position;

FIG. 5 is a perspective view showing the use of the protective garment-type cover disposed over a carriage in the form of a tandem bicycle seat for child users;

FIG. 6 is a top plan view showing the folding and the stuffing of the protective garment-type cover in a pouch which is integral with and forming part of the cover; and FIG. 7 is a perspective view of the completed folding and stuffing of the cover into the pouch.

DETAILED DESCRIPTION OF A PREFERRED EMBODIMENT

Referring now in more detail and by reference characters to the drawings which illustrate a preferred embodiment of the present invention, P designates a protective garment-type cover which is constructed in accordance with and embodies the present invention. In FIG. 1, the protective garment-type cover is used in connection with a carriage in the form of a baby stroller S.

The term "carriage" as used in connection with the present invention, is used in a broad sense to encompass essentially any type of carrier for a child, whether or not that child is the age of an infant or older. Thus, and for purposes of the invention, the term "carriage" would include, but is not limited to, baby strollers, conventional four-wheeled carriages, bicycle seats and the like. The protective garment-type cover of the invention can actually be used as a protective cover to enclose a child user in a carriage of the type illustrated in FIG. 1. Otherwise, it can be used in the form of a poncho or jacket, such as in the garment-type arrangement, as best illustrated in FIG. 2 of the drawings. In either case, the device is not altered in its construction for use.

The protective garment-type cover of the invention comprises an outer body-encircling cloth-like sheet forming a continuous wall 10 which is provided with a lower opening 12 sized to extend over a child user or otherwise, to extend over a portion of a carriage for a child user, as best illustrated, for example, in FIGS. 1–3 of the drawings. In this case, the lower opening 12 is provided with an elastic band 14 surrounding the periphery of the opening so as to cause the cloth-like material forming the continuous wall 10 to tightly engage either a portion of the frame of the carriage, or otherwise a portion of the child user who has donned the same for protection from inclement weather.

The cloth-like material wall 10 used in the formation of the protective garment-like P may be formed of any suitable cloth which is preferably water impervious. Thus, and for this purpose, the cloth-like material may be formed of a plastic or otherwise, may be formed of a fabric which is plasticized, so as to render the same water impervious. Any conventional material essentially may be employed for this purpose.

The continuous wall 10 is also provided with an upper neck opening 16, as best illustrated in FIGS. 1, 3 and 4 of the drawings. This neck opening 16 is provided to allow the head and a portion of the neck of the child user to extend through the cloth-like material wall 10 as illustrated. Furthermore, a drawstring 18 may also be provided for extending around the neck region in order to tighten the opening about the child user's neck. The mechanism of securing the drawstring 18 to the neck region is essentially conventional and is therefore neither illustrated nor described in any further detail herein.

Integral with and extending above the continuous wall 10 is a head portion or so-called "hood" 20 which is adapted to partially enclose the head of the child user. In this case, it can be seen that the hood 20 can be used optionally, as shown in FIG. 1, or it may not be used, as for example, as illustrated in the arrangement of FIG. 2.

When the protective garment-type cover P is disposed over a carriage, it can be seen that the cover effectively envelopes the child user in the carriage and effectively seals the entire body of the child user from any inclement weather, with the exception of the head protruding above the neck region 16. Furthermore, when the hood 20 is raised and covers the crown of the head of the user, essentially only the face portion of the user is exposed, along potentially with the arms of the user.

The protective cover of the invention is also provided with an elongate zippered opening 21 extending downwardly from the opened neck region 16, although not to the bottom opening 12. In this way, the continuous wall 10 is preserved. This zippered opening 21 allows for easy dressing on a child user and removal from the child user, as well as the carriage therefor.

The continuous wall 10 is also provided with a pair of arm openings 22 which allow the arms of the user to project through the protective cover, as illustrated, for example, in FIG. 1. Here again, it is not necessary to have the child user extend his or her arms through the openings 22, although this does provide a greater degree of mobility.

The protective garment-type cover P of the invention is further provided with an excess material section 24 located at the rear portion thereof. This excess material portion 24 is also provided with an opening 26 to allow handles 28 of a carriage to project therethrough, as best illustrated in FIG. 3 of the drawings. The opening 26 may also be provided with a surrounding peripheral elastic band 30 for again tightly enclosing the continuous side wall 10 about the handles 28 as shown in FIG. 4. In addition, a protective flap 32 extends over any portion of the continuous wall 10 which might otherwise be open. The protective flap 32 actually serves as a type of collar.

A pouch 34 is integral with the body 10 as shown in FIGS. 3 and 4. In this case, the pouch 34 is designed to hold the entire contents of the protective garment-type cover P therein, as hereinafter described in more detail.

The pouch 34 is also provided with an opening 36 to effectively stuff all of the remaining portions of the cloth-like material forming the protective cover P into the pouch. Furthermore, any means for releasibly locking the opening, as for example, by Velcro ® straps or the like, may be provided for this purpose.

Also integral with the cloth-like material is a second pocket or pouch 38 having a zippered opening 40, as illustrated in FIG. 3. In this case, the zippered opening 40 may be opened in order to obtain access to a cassette tape player schematically illustrated as 42 in FIG. 4. The cassette tape player 42 is electrically connected through wires 44 to speakers 46 located in the hood 18 and proximate to the ear regions of the child user. In this way, an adult or other attendant to the child can operate the cassette player 42 and generate music or other sounds for listening by the child user. This is an important factor, particularly in inclement weather, since the music itself may entertain or otherwise soothe the child user.

The protective garment-type cover P may also be provided with straps 47 for securement of the cover P to a carriage. In this case, the straps 47 may be provided with releasible snaps 48 so that the device effectively can snap-fit onto the carriage. Although only one such pair of straps has been illustrated in FIG. 4, it should be understood that any suitable number of straps could be provided. Further, these straps would also be provided with snap fasteners or other releasible-type fasteners.

The device of the present invention is highly versatile in that it is effectively useable with essentially all sizes and shapes of most commercially available strollers and like carriages. Further, the versatility of this device enables the protective cover to be worn as a garment by a child user, even though not in a carriage. The protective garment-like cover P is also designed so that it can be provided in an individual size adapted to fit a large number of individuals ranging from infancy to at least five years of age.

The cloth-like material is lightweight, as previously indicated, and is also water impervious. When the device is folded and stored in the pouch 34 as indicated in FIG. 6, it provides a relatively small and highly compact unit, as best illustrated in FIG. 7. This folded unit is very easy to carry and is easily storeable, both on a stroller or other carriage or in other locations. The cloth-like material is also washable.

In accordance with the present invention, even when the attendant to the child user should encounter rain or excessive winds, the attendant, such as the adult, can immediately places the protective garment over the infant or other child user and the carriage in which the child user is seated. The elastic bands 14 and automatically allow the cover to effectively seal itself around the child user. In this way, the child can still enjoy a warm, dry and happy outing whether or not the weather itself may be inclement.

Thus, there has been illustrated and described a unique and novel protective garment-type cover for disposition over a child user, as well as for potential disposition over the carriage holding that child user. The present invention thereby fulfills all of the objects and advantages which have been sought therefor. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by letters patent is:

1. A protective garment-type cover for disposition over a child user and for potential disposition over a carriage having a seat section with a peripheral wall and an underside for such child user, said protective garment-type cover comprising:

a) a flexible and foldable material sheet having a partially enclosing continuous wall forming an upper section to surround a torso of a child user and a lower section;

b) an enlarged opened lower end in said lower section for disposition over a child user and for disposition over a portion of a carriage for said child user;

c) an opened neck region in said partially enclosing continuous wall of Said upper section to allow the head of the child user to project outwardly of the continuous wall when in use and with the continuous wall protecting the remaining portion of the child user from inclement weather when fully surrounding the child user and draped over a portion of the carriage;

d) said lover section having an enlarged portion forming part of said partially enclosing continuous wall and which extends around and envelopingly surrounds the seat section of the carriage, said enlarged to portion of said lower section having a size sufficient cover the peripheral wall and extend beneath the underside of said seat section where,in fully isolating the seat section from rain and completely enclosing the child and seat so that only the arms and head of the child may be exposed in inclement weather; and e) the flexible and foldable material sheet being light in weight and capable of being folded into a small compact unit for storage and transportation and capable of being easily and rapidly opened for disposition over a child user and over a carriage therefor.

2. The protective garment-type area of claim 1 further characterized in that a pouch is integral with said material sheet and enables said material sheet to be stored in said pouch when in the small compact condition.

3. The protective garment-type cover of claim 1 further characterized in that said partially enclosing continuous wall is provided with an arm opening allowing a child user's arms to extend therethrough.

4. The protective garment-type cover of claim 3 further characterized in that said upper section of said partially enclosing continuous wall is provided with additional openings to receive handle portions of said carriage.

5. The protective garment-type cover of claim 1 further characterized in that said protective garment-type cover is provided with an openable front portion which is in communication with said opened neck region.

6. The protective garment-type cover of claim 1 further characterized in that said cover is sized and shaped for disposition over a stroller and envelopingly encloses the seat section of the stroller and a portion of the handles of the stroller, and said upper section has openings to allow handles on said carriage to extend therethrough, 7. The protective garment-type cover of claim 1 further characterized in that an elastic strap surrounds said enlarged opened lower end for snugly conforming to a child user or a carriage which is transporting the child user and which causes the lower end to fully cover the peripheral wall of the seat section and extend beneath a portion of the underside of the seat section.

8. The protective garment-type cover of claim 1 further characterized in that a hood is connected to said partially enclosing continuous wall for disposition over a head of a child user.

9. The protective garment-type cover of claim 8 further characterized in that said partially enclosing continuous wall is provided with a pocket for holding a sound-generating device, and speakers are located in said hood and connected to said sound-generating device.

10. A protective cover for disposition over a carriage of the type having a seat section with a periphery and an underside for transporting a child and to protect the child user from inclement weather conditions, said protective cover comprising:
   a) a flexible and foldable material sheet having a partially enclosing continuous wall forming an upper section to surround a torso of a child user and a lower section and which is light in weight and easily foldable and unfoldable;
   b) an enlarged opened lower end portion in said lower section for disposition over a child user and for disposition over a portion of a carriage including the seat section for said child user, said enlarged portion of said lower section having a size sufficient to cover the peripheral wall and extend beneath the underside of said seat section;
   c) an opened neck region in said partially enclosing continuous wall to allow the head of the child user to project outwardly of the continuous wall when in use and with the continuous wall protecting the remaining portion of the child user from inclement weather when fully surrounding the child user and draped over a portion of the carriage;
   d) said material sheet also having both a size and shape such that it may be worn by child user as a jacket when not used with a carriage; and
   e) a pocket formed integrally with said continuous wall and which is relatively unobservable when the cover is in use, said pocket being located on said continuous wall in a position where the remaining portion of the continuous wall and the entire protective cover beyond said pocket can be folded and stuffed into said pocket so that the area becomes a small neatly folded compact package which is easily stored and transportable.

11. The protective garment-type cover of claim 10 further characterized in that the flexible and foldable material sheet is capable of being easily and rapidly removed from said pocket and opened for disposition over a child user and over a carriage therefor.

12. The protective garment-type cover of claim 11 further characterized in that said enlarged section forming part of said partially enclosing continuous wall extends around and envelopingly surrounds the seat section of the carriage thereby fully isolating the seat section from rain and completely enclosing the child so that only the arms and head of the child may be exposed in inclement weather.

13. The protective garment-type cover of claim 10 further characterized in that a hood is connected to said partially enclosing continuous wall for disposition over a head of a child user.

14. The protective garment-type cover of claim 13 further characterized in that said partially enclosing continuous wall is provided with a pocket for holding a sound-generating device, and speakers are located in said hood and connected to said sound-generating device.

15. The protective cover of claim 10 further characterized in that said upper section of said garment-type cover having openings to receive handles on said carriage structure and allow same to extend therethrough.

16. A combination of a carriage for a child user having a seat section and a protective garment-type cover for disposition over a child user and for disposition over the carriage and seat section for such child user, said combination carriage and protective garment-type cover comprising:
   a) a carriage structure comprised of a main frame;
   b) a seat section on said main frame and having a periphery and an underside and being sized and located to seat a small child therein;
   c) a garment-type cover comprised of a flexible and foldable material sheet having a partially enclosing continuous wall forming an upper section to surround a torso of a child user and a lower section;
   d) an enlarged opened lower end in said lower section and at a lower end of said continuous wall for disposition over a child user and for disposition over a portion of the carriage and the seat section for said child user;
   e) an opened neck region in said partially enclosing continuous wall of said upper section to allow the head of the child user to project outwardly of the continuous wall when in use and with the continuous wall protecting the remaining portion of the child user from inclement weather when fully surrounding the child user and draped over a portion of the carriage;
   f) said lower section having an enlarged portion forming part of said partially enclosing continuous wall and which extends around and envelopingly surrounds the seat section of the carriage, said enlarged portion of said lower section having a size sufficient to cover the peripheral wall and extend beneath the underside of said seat section wherein fully isolating the seat section from rain and completely encloses the child and the seat so that only the arms and head of the child may be exposed in inclement weather; and
   g) the flexible and foldable material sheet being light in weight and capable of being folded into a small compact unit for storage and transportation and capable of being easily and rapidly opened for disposition over a child user and over a carriage therefor.

17. The combination carriage and protective garment-type cover of claim 16 further characterized in that a pocket is formed integrally with said continuous wall and which is relatively unobservable when the cover is in use, said pocket being located on said continuous wall in a position where the remaining portion of the continuous wall and the entire protective cover beyond said pocket can be folded and stuffed into said pocket so that the cover becomes a small neatly folded compact package which is easily storable and transportable.

18. The combination carriage and protective garment-type cover of claim 16 further characterized in that said partially enclosing continuous wall is provided with arm openings in said upper section allowing a child user's arms to extend therethrough, and that said partially enclosing continuous wall is provided with additional openings to receive handle portions of said carriage allowing said handle portions to extend therethrough.

19. The combination carriage and protective garment-type cover of claim 18 further characterized in that said protective garment-type cover is provided with an openable front portion which is in communication with said opened neck region.

20. The combination of claim 16 further characterized in that said upper section of said garment-type cover having openings to receive handles on said carriage structure and allow same to extend therethrough.

* * * * *